(12) United States Patent
Okmyanskiy et al.

(10) Patent No.: US 9,143,995 B2
(45) Date of Patent: Sep. 22, 2015

(54) SYSTEM AND METHOD FOR HAND-IN DISAMBIGUATION USING USER EQUIPMENT WIFI LOCATION IN A NETWORK ENVIRONMENT

(71) Applicant: CISCO TECHNOLOGY, INC., San Jose, CA (US)

(72) Inventors: Anton Okmyanskiy, Vancouver (CA); Mickael Graham, Bellevue Hill (AU); Mark Grayson, Maidenhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 103 days.

(21) Appl. No.: 14/066,420

(22) Filed: Oct. 29, 2013

(65) Prior Publication Data
US 2014/0241316 A1    Aug. 28, 2014

Related U.S. Application Data

(60) Provisional application No. 61/767,903, filed on Feb. 22, 2013.

(51) Int. Cl.
*H04W 36/00* (2009.01)
*H04W 36/32* (2009.01)

(52) U.S. Cl.
CPC ...... *H04W 36/0083* (2013.01); *H04W 36/0061* (2013.01); *H04W 36/0066* (2013.01); *H04W 36/0072* (2013.01); *H04W 36/32* (2013.01)

(58) Field of Classification Search
None
See application file for complete search history.

(56) References Cited

U.S. PATENT DOCUMENTS

| 7,379,739 | B2 * | 5/2008 | Rajkotia et al. ............ 455/439 |
|---|---|---|---|
| 8,320,965 | B2 | 11/2012 | Kwun |
| 8,340,711 | B1 | 12/2012 | Glass et al. |
| 8,588,698 | B2 | 11/2013 | Brisebois et al. |
| 8,792,886 | B2 | 7/2014 | Meshkati |

(Continued)

FOREIGN PATENT DOCUMENTS

| WO | WO2013/041574 | 3/2013 |
|---|---|---|
| WO | WO2013/082245 | 6/2013 |

(Continued)

OTHER PUBLICATIONS

"Broadband Forum Technical Report: TR-196 Femto Access Point Service Data Model," Issue: 1, Issue Date: Apr. 2009, ©The Broadband Forum; 131 pages.

(Continued)

*Primary Examiner* — Christopher Crutchfield
(74) *Attorney, Agent, or Firm* — Patent Capital Group

(57) ABSTRACT

An example method is provided in one example embodiment and includes receiving a handover request from a first radio network to handover a user equipment (UE) to a second radio network, wherein the handover request includes an international mobile subscriber identity (IMSI) for a user associated with the UE and a pseudo cell identifier (ID); determining a target channel configuration for the UE using the pseudo cell ID; querying a third radio network using the user IMSI to determine a location of the UE, wherein at least one access point in the third radio network is in communication with the UE; and selecting a particular target access point in the second radio network for handover of the UE based, at least in part, on the location of the UE, the target channel configuration for the UE and a location of the particular target access point.

20 Claims, 5 Drawing Sheets

(56) References Cited

U.S. PATENT DOCUMENTS

| | | | |
|---|---|---|---|
| 2006/0229087 | A1* | 10/2006 | Davis et al. ............... 455/456.1 |
| 2010/0056184 | A1 | 3/2010 | Vakil |
| 2010/0240314 | A1 | 9/2010 | Chang |
| 2010/0260036 | A1 | 10/2010 | Molnar et al. |
| 2010/0260068 | A1 | 10/2010 | Bhatt et al. |
| 2010/0279628 | A1 | 11/2010 | Love et al. |
| 2011/0110316 | A1 | 5/2011 | Chen et al. |
| 2011/0211514 | A1 | 9/2011 | Hamalainen |
| 2012/0004003 | A1 | 1/2012 | Shaheen et al. |
| 2012/0129537 | A1* | 5/2012 | Liu et al. ..................... 455/444 |
| 2012/0258720 | A1 | 10/2012 | Tinnakornsrisuphap et al. |
| 2012/0265888 | A1 | 10/2012 | Roeland et al. |
| 2013/0003697 | A1 | 1/2013 | Adjakple et al. |
| 2013/0077482 | A1 | 3/2013 | Krishna et al. |
| 2013/0136072 | A1 | 5/2013 | Bachmann et al. |
| 2013/0163543 | A1 | 6/2013 | Freda et al. |
| 2013/0182680 | A1* | 7/2013 | Choi et al. ..................... 370/331 |
| 2013/0229945 | A1 | 9/2013 | Cha et al. |
| 2013/0294356 | A1 | 11/2013 | Bala et al. |
| 2013/0308531 | A1 | 11/2013 | So et al. |
| 2013/0326001 | A1 | 12/2013 | Jorgensen et al. |
| 2013/0337821 | A1 | 12/2013 | Clegg |
| 2013/0339783 | A1 | 12/2013 | Alonso et al. |
| 2013/0343304 | A1 | 12/2013 | Kaippallimalil et al. |
| 2014/0003225 | A1 | 1/2014 | Mann et al. |
| 2014/0010086 | A1 | 1/2014 | Etemad et al. |
| 2014/0011505 | A1 | 1/2014 | Liao |
| 2014/0078986 | A1 | 3/2014 | Kaippallimalil et al. |
| 2014/0086226 | A1 | 3/2014 | Zhao et al. |
| 2014/0112251 | A1 | 4/2014 | Kim et al. |
| 2014/0146732 | A1 | 5/2014 | Olufunmilola et al. |
| 2014/0155109 | A1 | 6/2014 | Vaidya et al. |

FOREIGN PATENT DOCUMENTS

| | | |
|---|---|---|
| WO | WO2013/086659 | 6/2013 |
| WO | WO2013/169991 | 11/2013 |

OTHER PUBLICATIONS

"Broadband Forum Technical Report: TR-069 CPE WAN Management Protocol," Issue: 1, Amendment 4, Issue Date: Jul. 2011 Protocol Version 1.3; ©The Broadband Forum; 190 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.

"ETSI TS-125-469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," ©European Telecommunications Standards Institute 2013; Apr. 2013; 78 pages.

U.S. Appl. No. 14/092,448, entitled "System and Method for Small Cell Power Control in an Enterprise Network Environment," filed Nov. 27, 2013.

U.S. Appl. No. 14/481,654, entitled "System and Method for Supporting Cell Updates Within a Small Cell Cluster for Idle Mobility in Cell Paging Channel Mode," filed Sep. 9, 2014.

U.S. Appl. No. 14/679,868, filed Apr. 6, 2015, entitled "System and Method for Managing Interference in a Network Environment Based on User Presence," Inventors: Mark Grayson, et al.

U.S. Appl. No. 14/687,198, filed Apr. 15, 2015, entitled "System and Method for Managing Interference in a Network Environment Based on User Presence," Inventors: Mark Grayson, et al.

U.S. Appl. No. 14/534,792, filed Nov. 6, 2014, entitled "System and Method for Providing Message Delivery and Paging to a Group of Users in a Network Environment," Inventors: Maulik Vijay Vaidya, et al.

U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.

U.S. Appl. No. 14/480,284, filed Sep. 8, 2014, entitled "System and Method for Internet Protocol Version-Based Multiple Access Point Name Support in a Network Environment," Inventors: Mark Grayson, et al.

U.S. Appl. No. 14/536,642, filed Nov. 9, 2014, entitled "System and Method for Radio Aware Traffic Management Based Wireless Authorization," Inventors: Ian McDowell Campbell, et al.

U.S. Appl. No. 14/534,883, filed Nov. 6, 2014, entitled "System and Method for Providing Message Delivery and Paging to a Group of Users in a Network Environment," Inventors: Maulik Vijay Vaidya, et al.

U.S. Appl. No. 14/612,794, filed Feb. 3, 2015, entitled "System and Method for Providing Collaborative Neighbor Management in a Network Environment," Inventors: Nigel Edward Warbuton, et al.

U.S. Appl. No. 14/597,036, filed Jan. 14, 2015, entitled "System and Method for Providing Collision-Avoided Physical Downlink Control Channel Resource Allocation in a Network Environment," Inventors: Qing Zhao, et al.

U.S. Appl. No. 14/612,827, filed Feb. 3, 2015, entitled "System and Method Providing Policy Charging and Rules Function Discovery in a Network Environment," Inventors: Konstantin Livanos, et al.

U.S. Appl. No. 14/614,500, filed Feb. 5, 2015, entitled "System and Method for Providing Policy Charging and Rules Function Discovery in a Network Environment," Inventors: Konstantin Livanos, et al.

"3GPP TS 23-203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, 650 Route des Lucioles, F-06921 Sophia Antipolis Valbonne, France; Sep. 2014.

"3GPP TS 32.522 v11.2.0 Technical Specification: 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project, 650 Route des Lucioles, F-06921 Sophia Antipolis Valbonne, France; Jun. 2014.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project, 650 Route des Lucioles, F-06921 Sophia Antipolis Valbonne, France; Sep. 2014.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); 51 Application Protocol (S1AP) (Release 12)," [Relevant Sections 9.1.6 and 9.2.3.13 only]; 3rd Generation Partnership Project 650 Route des Lucioles, F-06921 Sophia Antipolis Valbonne, France, Sep. 2014.

"3GPP TS 23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project, 650 Route des Lucioles, F-06921 Sophia Antipolis Valbonne, France; Sep. 2014.

"3GPP TS 29-274 V12-6-0 (Sep. 2014) Technical Specification: 3rd Generation Partnership Project; Technical Specification Group Core

(56) References Cited

OTHER PUBLICATIONS

Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project, 650 Route des Lucioles, F-06921 Sophia Antipolis Valbonne, France; Sep. 2014.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.
"3GPP TR 23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project, 650 Route des Lucioles, F-06921 Sophia Antipolis Valbonne, France; Dec. 2013.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project, 650 Route des Lucioles, F-06921 Sophia Antipolis Valbonne, France; Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project, 650 Route des Lucioles, F-06921 Sophia Antipolis Valbonne, France; Jun. 2014.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project, 650 Route des Lucioles, F-06921 Sophia Antipolis Valbonne, France; Sep. 2014.
"ETSI TS 123 401 V12.70 (Jan. 2015) Technical Specification: "LTE; General Packet Radio Service (GPRS) enhancements for Evolved Universal Terrestrial Radio Access Network (E-UTRAN) access (EGPP TS 23.401 version 12.7.0 Release 12), Section 4 only, European Telecommunications Standards Institute, 650 Route des Lucioles, F-06921 Sophia Antipolis Cedex, France; Jan. 2015; 77 pages.
"ETSI TS 125 367 V9.4.0 Technical Specification: Universal Mobile Telecommunications System (UMTS); Mobility procedures for Home Node B (HNB); Overall description; Stage 2 (3GPP T525.367 version 9.4.0 Release 9)", European Telecommunications Standards Institute, 650 Route des Lucioles, F-06921 Sophia Antipolis Cedex, France, Jun. 2010; 17 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.
"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"ETSI TD 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289292; §8.5.21 pp. 357-365; §10.2.7 pp. 620-623; Annex B.3 pp. 2045-2052].
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Sections 5.3.2 and 5.3.5 only]; ETSI, 650 Route des Lucioles, F-06921, Sophia Antipolis Cedex-France, Sep. 2014.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex-France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.
"ETSI TD 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"GSMA LTE Roaming Guidelines, Version 9.0," GSM Association, Official Document IR88, Jan. 24, 2013; 53 pages.

(56) References Cited

OTHER PUBLICATIONS

"Paging Channel Selection," UMTS World; first published on or about Jun. 22, 2003; 3 pages http://www.umtsworld.com/technology/paging.html.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"PDCCH Construction, Expert Opinion," posted by Hongyan on May 20, 2011; LTE University, 4 pages; http://lteuniversity.com/get_trained/expert_opinion1/b/hongyanlei/archive/2011/05/20/pdc ch-construction.aspx.

"PDCCH Processing," published by Gio Zakradze on Dec. 29, 2014; 56 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Extensible Authentication Protocol," Wikipedia, the free encyclopedia, Sep. 16, 2013, 10 pages; http://en.wikipedia.org/wiki/Extensible_Authentication_Protocol#EAP-FAST.

"Link Layer Discovery Protocol," Wikipedia, the free encyclopedia, Sep. 25, 2013, 4 pages; http://en.wikipedia.org/wiki/Link_Layer_Discovery_Protocol.

"RADIUS," Wikipedia, the free encyclopedia, Sep. 26, 2013, 12 pages http://en.wikipedia.org/wiki/RADIUS.

"TR-196 Femto Access Point Service Data Model," Broadband Forum Technical Report, Issue 2, Issue Date: Nov. 2011, ©The Broadband Forum. All Rights Reserved; 46 pages.

Adrangi, F., et al., "Chargeable User Identity," Network Working Group RFC 4372, Jan. 2006, 10 pages.

Calhoun, P., "Diameter Base Protocol," Network Working Group RFC 3488, Sep. 2003; 147 pages.

Droms, R., "Dynamic Host Configuration Protocol," Network Working Group RFC 2131, Mar. 1997; 45 pages.

Guttman, E., et al., "Service Location Protocol, Version 2," Network Working Group RFC 2608, Jun. 1999, 57 pages.

Haverinen, H., "Extensible Authentication Protocol Method for Global System for Mobile Communications (GSM) Subscriber Identity Modules (EAP-SIM)," Network Working Group RFC 4186, Jan. 2006, 93 pages.

Holbrook, H., et al., "Source-Specific-Multicast for IP," Network Working Group RFC 4607, Aug. 2006.

Horn, Gavin, "3GPP Femtocells: Architecture and Protocols," Qualcomm Incorporated, 5775 Morehouse Drive, San Diego, CA, Sep. 2010; 64 pages.

Leung, K., et al., "WiMAX Forum/3GPP2 Proxy Mobile IPv4," Independent Submission RFC 5563, Feb. 2010; 41 pages.

Narten, T., et al., "Neighbor Discovery for IP version 6 (IPv6)," Network Working Group RFC 4861, Sep. 2007; 97 pages.

Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.

Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-cce-allocation.html.

Ashraf, Imran, "Distributed Radio Coverage Optimization in Enterprise Femtocell Networks," International Conference on Communications ICC 2010, May 23-27, 2010, Cape Town, South Africa; 6 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Saad, Sawsan A., et al., "A Survey on Power Control Techniques in Femtocell Networks," Journal of Communications vol. 8, No. 12, Dec. 2013; 10 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

\* cited by examiner

SYSTEM AND METHOD FOR HAND-IN DISAMBIGUATION USING USER EQUIPMENT WIFI LOCATION IN A NETWORK ENVIRONMENT

CROSS-REFERENCE TO RELATED APPLICATION

This application claims the benefit of priority under 35 U.S.C. §119(e) to U.S. Provisional Application Ser. No. 61/767,903, "3G Hand-In Disambiguation Using UE WiFi Location" filed on Feb. 22, 2013, which is hereby incorporated by reference in its entirety.

TECHNICAL FIELD

This disclosure relates in general to the field of communications and, more particularly, to a system and method for hand-in disambiguation using user equipment WiFi location in a network environment.

BACKGROUND

Networking architectures have grown increasingly complex in communication environments. For example, small cells have gained notoriety due to their capabilities to connect wireless devices to a network. In general terms small cell access points can operate in a licensed spectrum to connect user equipment to the network, often using broadband connections. For a mobile operator, small cell access points can offer improvements to both coverage and capacity, which is particularly applicable to indoor networking environments where macro cells typically suffer coverage limitations. Small cell access points can also offer an alternative networking architecture to deliver the benefits of fixed-mobile convergence. However, there are significant challenges in managing access to small cell access points, particularly in the context of hand-in operations from macro cells.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
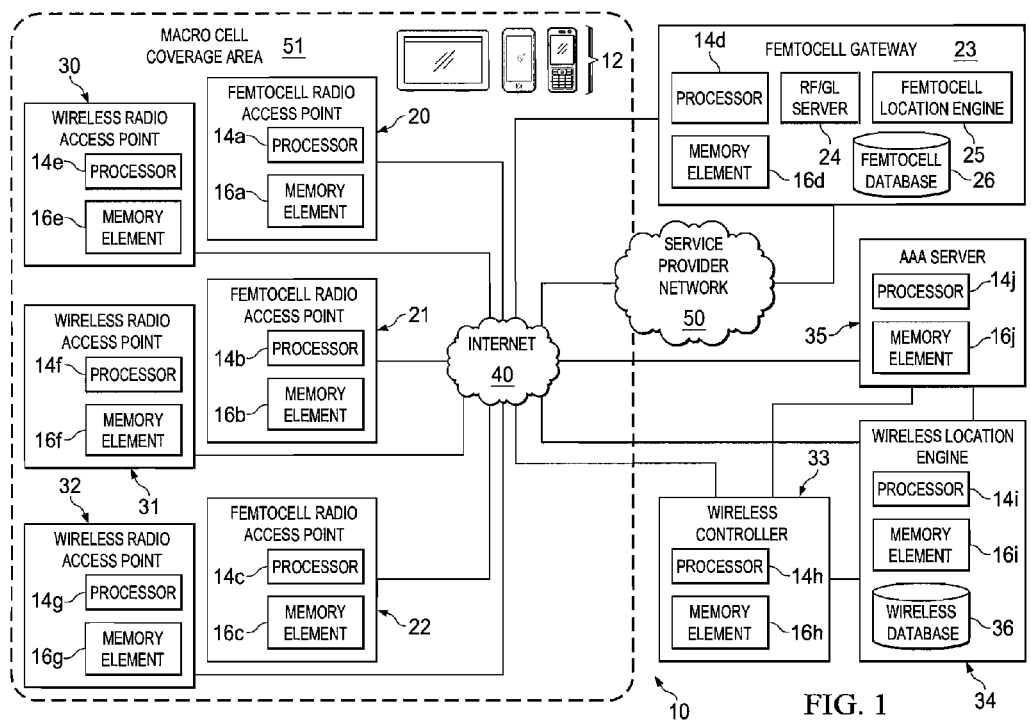
FIG. 1 is a simplified block diagram of a communication system for performing hand-in disambiguation activities according to one embodiment of the present disclosure.

A method is provided in one example embodiment and includes receiving a handover request from a first radio network to handover a user equipment (UE) to a second radio network, wherein the handover request includes an international mobile subscriber identity (IMSI) for a user associated with the UE and a pseudo cell identifier (ID) and wherein the second radio network includes a plurality of target access points; determining a target channel configuration for the UE using the pseudo cell ID; querying a third radio network using the user IMSI to determine a location of the UE, wherein at least one access point in the third radio network is in communication with the UE; and selecting a particular target access point in the second radio network for handover of the UE based, at least in part, on the location of the UE, the target channel configuration for the UE and a location of the particular target access point. In example embodiments, the particular target access point in the second radio network can be a Home Node B (HNB), a Node B (NB), a Home eNode B (HeNB) or an eNode B (eNodeB).

In more specific embodiments, the selecting can include comparing a location for each of the plurality of target access points to the location of the UE to determine one or more potential target access points near the location of the UE; comparing a channel configuration for each of the one or more potential target access points to the target channel configuration for the UE to determine one or more potential target access points having a channel configuration that matches the target channel configuration for the UE; and selecting the particular target access point from the one or more potential target access points that has a location near the location of the UE and that has a channel configuration that matches the target channel configuration for the UE.

In other example embodiments, the method may include, prior to receiving the handover request, registering the user IMSI with the third radio network. In example embodiments, the registering may include at least one of authenticating the UE with the third radio network using an extensible authentication protocol subscriber identity module (EAP-SIM) authentication technique to determine the user IMSI; authenticating the UE with the third radio network using a EAP authentication and key agreement (EAP-AKA) authentication technique to determine the user IMSI; and storing, in the third radio network, a media access control (MAC) address of the UE associated with the user IMSI.

In other instances, example embodiments of the present disclosure may include maintaining a handover history for each of the one or more potential target access points, wherein the handover history comprises the user IMSI and a handover success factor for each of the one or more potential target access points that indicates handover success rates for past handovers to the one or more potential target access points for the UE. In some instances, if more than one potential target access point is near the location of the UE and has a channel configuration that matches the target channel configuration for the UE, the method can include comparing the handover success factors for each of the one or more potential target access points to determine a highest handover success factor for a corresponding potential target access point; and selecting the particular target access point from the one or more potential target access points that has a location near the location of the UE, that has a channel configuration that matches the target channel configuration for the UE and that has the highest handover success factor. In yet another embodiment, the method can include filtering out from one or more potential target access points any potential target access point that is in a closed access mode. In still another embodiment, the method can include filtering out from the one or more potential target access points and potential target access point that is in a closed mode that the user is not authorized to access.

Example Embodiments

Turning to FIG. 1, FIG. 1 is a simplified block diagram of a communication system 10 for performing hand-in disambiguation activities in a network environment in accordance with one embodiment of the present disclosure. FIG. 1 includes a user equipment (UE) 12, femtocell radio access points 20, 21, 22, a femtocell gateway (FGW) 23, wireless radio access points 30, 31, 32, a wireless controller (WC) 33, a wireless location engine (WLE) 34, an Authentication, Authorization and Accounting (AAA) server 35, an internet 40 and a service provider network 50. For purposes of brevity, femtocell radio access points are abbreviated FAPs and wireless radio access points are abbreviated WAPs. FAPs 20, 21, 22, FGW 23, WAPs 30, 31, 32, WC 33, WLE 34 and AAA server 35 may each include a respective processor 14a-14j and a respective memory element 16a-16j. FGW 23 may further include an RF/geo-location (RF/GL) server 24, a femtocell location engine (FLE) 25 and a femtocell database 26. WLE 34 may further include a wireless database 36. As used herein in the present disclosure, small cells may be referred to as femtocells interchangeably.

FAPs 20, 21 and 22 may be connected to FGW 23 via internet 40. FGW 23 may further be connected to service provider network 50 in this example implementation. FAPs 20, 21, 22 and FGW 23 may make up a femtocell radio network or femtocell system. WAPs 30, 31 and 32 may be connected to WC 33, WLE 34 and AAA server 35 via internet 40. WAPs 30, 31, 32, WC 33, WLE 34 and AAA server 35 may make up a wireless or WiFi radio network, also referred to herein as a wireless or WiFi system.

Also shown in FIG. 1 is a macro cell coverage area 51. A macro cell radio access network (RAN) may be connected to the service provider network 50, which may provide cellular/mobile coverage for macro cell coverage area 51. In various instances, the macro cell RAN may include access networks such as GSM EDGE radio access network (GERAN), UMTS terrestrial radio access network (UTRAN), generally referred to as 3G, and/or long term evolution (LTE) access networks such as evolved UTRAN (E-UTRAN), generally referred to as 4G or LTE. UE 12 may be dual-mode equipment configured with wireless (e.g., WiFi) communication capabilities as well as cellular/mobile communication capabilities.

Before detailing some of the operational aspects of FIG. 1, it is important to understand common characteristics of small cell access points (APs), femtocells, etc. as they generally operate in commercial architectures. The following foundation is offered earnestly for teaching purposes only and, therefore should not be construed in any way to limit the broad teachings of the present disclosure. In many architectures, femotcells can be deployed as autonomous units to improve reception in areas with poor coverage, or within buildings where coverage is reduced by the structure itself. UE that are attached to (and in communication with) small cell APs (e.g., FAPs) can have their data transmissions routed to the service provider's network (e.g., over the internet, over any suitable network, etc.). In Open Mode deployments, coverage provided by a small cell AP is generally open to anyone within range; unless configurations operate to limit access to the network to only those individuals duly authorized for access.

Essentially, FAPs are fully featured base stations that can provide proximate coverage in a business (e.g., enterprise) environment. Typically, femtocells operate at low radio power levels as compared to macro cell RANs. FAPs can be connected using a standard broadband digital subscriber line (DSL), internet or cable service into the service provider's network. Calls can be made and received, where the signals are sent (potentially encrypted) from the FAP via the broadband IP network to one of the operator's main switching centers. FAPs can be provisioned to readily handle 8, 16, 32, etc. concurrent calls.

In operation, when in range of a FAP (e.g., in an enclosed environment such as a building, etc.), a given UE can automatically detect the FAP through various measurement operations to detect signal quality of neighboring cells. The UE can provide measurement reports including channel information for neighboring cells to a serving macro cell RAN. Based on the reports, the macro cell RAN may determine to initiate a hand-in operation by sending a dummy or pseudo cell identifier (ID) and an International Mobile Subscriber Identity (IMSI) of a given user associated with the UE to an FGW and for the FGW to try and determine which small cell AP to select for the hand-in. Note this is a hand-in operation from the neighboring cell's perspective and a "hand-out" from the serving macro cell RAN perspective. Using the pseudo cell ID, the FGW can determine a target channel configuration for the UE and can try to determine an appropriate FAP for hand-in of the UE. For 3G networks, the target channel configuration can include an UMTS terrestrial radio access (UTRA) absolute radio frequency channel number (UARFCN) and primary scrambling code (PSC). For 4G networks, the target channel configuration can include an evolved UTRA (E-UTRA) absolute radio frequency channel number (EARFCN) and physical cell identifier (PCI).

However, there are certain problems associated with hand-in operations for 3G/LTE networks for macro cell to small cell AP hand-ins. For example, equipment manufacturers and vendors of 3G/LTE UE and macro cell equipment chose not to provide optional unique small cell identification information in measurement reports to the serving cell. The serving cell (e.g., macro cell) is then forced to determine the target of handover via the FGW based purely on UARFCN and PSC for 3G networks and EARFCN and PCI for LTE networks.

With limited number of UARFC and PSC combinations in use (limited by neighbor list size of 32) for 3G networks and a limited number of EARFCN and PCI combinations in use for LTE networks, it becomes increasingly difficult for an FGW to disambiguate among a large number of small cell APs in a given macro cell coverage area for Open Mode deployments. This widely known issue makes practical deployments of hand-in for small cells increasingly difficult and hinders mass 3G/LTE small cell adoption. Without support for connected mode hand-in, end users experience dropped voice calls and UEs cause unnecessary interference when moving into small cell coverage with active services.

Release 9 of the 3rd Generation Partnership Project (3GPP) standards has addressed this issue through a PSC disambiguation technique, which enables a UE when in connected mode to create transmission gaps to decode the system information from the neighbor and report this back to the network. This layer 3 cell identity can then be used to uniquely identify a target cell for handover. However, equipment manufacturers have yet to deploy R9 capable equipment, which leaves no practical way to deploy small cells on a large scale in Open Mode deployments where UEs can be allowed to access many small cell APs with support for connected mode hand-in from macro to small cell systems. Another typical attempt to solve this problem is to use a dummy cell ID in the macro cell and have the small cell GW disambiguate it to an appropriate small cell AP based on IMSI whitelists, but this solution is not a suitable solution for Open Mode or Hybrid Mode deployments where UEs can be allowed to access on many small cell APs.

In accordance with one embodiment, communication system 10 can overcome the aforementioned shortcomings (and others) by providing a mechanism to disambiguate a received pseudo cell ID to a target FAP for hand-in based, at least in part, on a location of the target FAP, on a target channel configuration for a given UE and on UE location in relation to one or more WAPs of the wireless system. In example embodiments discussed herein, FLE 25 may be configured to determine a target FAP for hand-in. By utilizing knowledge of UE location from the wireless system, FLE 25 can disambiguate a pseudo target cell ID to a specific target small cell (e.g., a particular target FAP), thus providing for macro to small cell hand-in capability. This solution avoids dependency on macro RAN vendors and/or equipment manufacturers to deliver release 9 (R9) defined PSC disambiguation, and more importantly, provides operation with pre-R9 UE, smartphones, tablets, etc. As used herein, the term 'handover' is used interchangeably with the term 'hand-in' to describe disambiguation activities.

The solution provided by the communication system 10 may allow for hand-in disambiguation for FAPs for 3G and/or LTE access networks. In various embodiments for 3G networks, FAPs 20, 21 and 22 may be implemented as Home Node Bs (HNBs) and/or Node Bs (NBs). For such 3G networks, FGW 23 can be implemented as a HNB-GW. In various embodiments for LTE networks, FAPs 20, 21 and 22 can be implemented as Home eNode Bs (HeNBs) and/or eNode Bs (eNodeBs). For such LTE networks, FGW 23 can be implemented as a HeNB-GW. Although FLE 25, as shown in FIG. 1, can be augmented within FGW 23, an FLE can also be implemented as a standalone unit or within network node, gateway and/or other element within a service provider network where a vendor or equipment manufacturer seeks to augment such femtocell location capabilities in such a manner.

In accordance with the teachings of the present disclosure, communication system 10 may be provisioned with certain configuration and/or registration information, including but not limited to user IMSI information, location and channel configuration information for each FAP 20, 21, 22 and location information for each WAP 30, 31, 32 to allow for hand-in disambiguation using UE location in relation the wireless system. Aside from provisioning the system with certain configuration information, each respective FAP 20, 21, 22 should be located in close proximity to each respective WAP 30, 31, 32. In some instances, as discussed below, a converged femto-wireless radio access point may be implemented in communication system 10 to combine both small cell and wireless radio access points in a common unit. Although three FAP/WAP 'sets' are shown in FIG. 1, it is understood that communication system 10 may be provisioned with more or less FAPs and WAPs depending on network environment.

Each WAP 30, 31, 32 may be configured with its corresponding physical location (e.g., latitude/longitude), which may be provisioned by an operator or by a global positioning system (GPS) receiver, which may be included in each WAP. Each WAP may register its location information with the WC 33 and/or the WLE 34 (e.g., in wireless database 36) for the wireless system. Further, each FAP 20, 21, 22 may be configured with its corresponding physical location (e.g., latitude/longitude), which may be provisioned by an operator for service provider network 50 through a femtocell management system (e.g., HNB Management System (HMS) for a 3G implementation) or by a GPS receiver, which may be included in each FAP. Each FAP 20, 21, 22 may register its location information with RF/GL server 24. In some instances, the location information for each FAP 20, 21, 22 may also be stored in the femtocell database 26.

Note that part of the solution being offered by communication system 10 can include registering a user (e.g., subscriber) IMSI for a given UE with the wireless system and storing a mapping of the user IMSI to a corresponding media access control (MAC) address for the corresponding UE/user combination. The mapping may otherwise be referred to herein as an "IMSI-to-MAC" mapping. In various instances, the IMSI-to-MAC mapping may be stored in the WC 33 (e.g., in memory element 16h), in WLE 34 (e.g., in wireless database 36) or both. As discussed in further detail below, the WLE may determine the location for a given UE based either on the user IMSI and/or the IMSI-to-MAC mapping.

It should be noted that once an IMSI-to-MAC mapping for a particular user/UE combination is stored in the wireless system, subsequent determinations of UE location from the wireless system (e.g., using WLE 34) may not need the UE to be attached to or have an active session established with a particular WAP. Rather the UE may merely be in communication with one or more WAPs through one or more wireless beacons that may be transmitted by the UE. During operation, the UE may transmit wireless beacons, which may be intercepted by one or more WAPs. The beacons may include the MAC address of the UE. The WAPs may, in turn, communicate such information to the WLE 34. Using the beacons, WLE 34 can determine both the user IMSI based on the previously registered IMSI-to-MAC mapping stored in WC 33 and/or wireless database 36 and the location of the UE through various UE location measurement techniques. The UE location measurement techniques can include, for example, received signal strength indicator (RSSI) measurements and/or time difference of arrival (TDOA) measurements for the UE for one or more WAPs receiving beacons from the UE to triangulate the location of the UE. In some instances, it is possible to resolve UE location to an accuracy below the typical coverage of a WAP, which can generally provide sufficient accuracy to identify a target FAP for hand-in.

In some instances, an IMSI-to-MAC mapping may be provided using an authentication and authorization procedure to register a particular user in the wireless system. The wireless system, including WAPs 30, 31, 32, WC 33 and WLE 34 may perform authentication and authorization using AAA server 35 for UE seeking to initiate a session with a particular WAP. In general terms, if a given UE seeks to initiate a session with a given WAP, the WAP may transmit, among other things, the user identity, for example a permanent IMSI, a temporary identity or a pseudonym previously allocated to the UE by AAA server 35, and MAC address for the given UE to the given WAP. The given WAP may communicate the information to the WC 33, which may coordinate with AAA server 35 to determine whether the UE may be permitted to consume resources at the given WAP.

Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data.

The wireless system can use different authentication techniques to initiate a session for a given UE. In one instance, the wireless system may use an extensible authentication protocol subscriber identity module (EAP-SIM) authentication technique to initiate a session for a given UE. In another to determine the wireless system may use an EAP authentication and key agreement (EAP-AKA) authentication technique to initiate a session for a given UE. Both authentication techniques may use secret key information stored on a SIM card in the UE 12 to perform authentication. The wireless system can use EAP-SIM/AKA for authentication with AAA server 35, which allows AAA server 35 to authenticate a user's identity and where that identity was a temporary identity, for example, a pseudonym, to associate that with a permanent identity IMSI. AAA server 35 may overwrite a username (e.g., a pseudonym identity assigned to a user/UE during authentication) with a given subscriber's IMSI. WC 33 may be configured with an AAA override option to allow AAA server 35 to overwrite the user-name with the IMSI for a user. The wireless system may store the user IMSI as well as mapping of the user IMSI and the UE MAC address and consequential identification of a wireless (e.g., WiFi) user in a WLE environment using the IMSI and/or the IMSI-to-MAC mapping for the user/UE combination.

In some instances, an operator may provision IMSI-to-MAC mappings for user/UE combinations for the wireless system to bypass authentication procedures in order to gather/store IMSI-to-MAC mappings for the wireless system. For example, in an enterprise setting, a given enterprise operator may provision IMSI-to-MAC mappings for user/UE combinations for a particular wireless system for employees, contractors, etc. such that the IMSI-to-MAC mapping may be automatically configured in the wireless system.

Turning to FAPs 20, 21, 22, aside from configuring location information for each FAP and registering this information in the RF/GL server 24 and/or the femtocell database 26, FAPs 20, 21, 22 may further be configured by an auto configuration server (ACS) provisioned by an operator according to the TR-096 interface using the TR-196 data model. Each FAP 20, 21, 22 may register its channel frequency information with RF/GL server 24. In some instances for 3G implementations, a given HNB may register its location with an RF/GL server in an HNB-GW as defined in TS 25.469. The HNB may further register its UARFCN and PSC with the RF/GL server. In other instances for LTE implementations, a given HeNB may register its location with an RF/GL server in an HeNB-GW. The HeNB may further register its EARFCN and PCI with the RF/GL server.

In operation, when a given UE 12 is within range of any one or more of FAPs 20, 21, 22 and is in communication with any one or more WAPs 30, 31, 32, the UE 12 can detect FAPs 20, 21, 22 through one or more measurement operations and can provide measurement reports to a serving macro cell controller. Based on the reports, the macro cell controller may determine to initiate a hand-in to a given FAP by transmitting a pseudo cell identifier (ID) and corresponding IMSI of a user associated with the UE 12 to FLE 25 so that FLE 25 can disambiguate the pseudo cell ID to a specific target FAP nearest to the location of UE 12 for the hand-in. Based on the received pseudo cell ID, FLE 25 may determine a target channel configuration for the UE 12, wherein the target channel configuration may correspond to a channel configuration for one or more of the FAPs 20, 21, 22. FLE 25 can be provisioned by an operator with a set of channel configurations including a particular pseudo cell ID for each channel configuration. Upon receiving a pseudo cell ID in a handover request, FLE 25 can determine the target channel configuration for UE 12 by performing a look-up using the received pseudo cell ID.

In a 3G implementation where the FAPs may be implemented as HNBs and the FGW may be implemented as an HNB-GW, the pseudo cell ID can be used to determine a target channel configuration, which may include a UARFCN (e.g., channel frequency number) and PSC. In such a 3G implementation, a macro cell radio network controller (RNC) can be provisioned with one or a small set of pseudo cell IDs that may correspond to HNB UARFCN/PSCs. The macro RNC can initiate a handover request to an FLE (e.g., within an HNB-GW) using the UE (e.g., user) IMSI and the pseudo target cell ID. In a 4G (LTE) implementation where the FAPs may be implemented as HeNBs and the FGW may be implemented as an HeNB-GW, the pseudo cell ID can be used to determine a target channel configuration, which may include an EARFCN (e.g., channel frequency number) and a PCI. In such a 4G (LTE) implementation a macro cell eNodeB can initiate handover via a Mobility Management Entity (MME) provisioned in service provider network 50, which may communicate the user IMSI and target channel configuration to an FLE.

Turning back to the example implantation shown in FIG. 1, FLE 25 may query WLE 34 through internet 40 using a Simple Object Access Protocol/Hypertext Transfer Protocol (SOAP/HTTP) query to get the location of UE 12 based on its association with one or more WAPs 30, 31, 32 in the wireless system. The query may include the IMSI for the user associated with the UE 12. WLE 34 may determine the location of the UE 12 based on the location of the UE 12 in relation to one or more WAPs 30, 31, 32.

For example, using the user IMSI for UE 12 and recovered IMSIs from previous authentications, WLE 34 can determine the location of the UE based on its WiFi association with one or more WAPs by the UE 12 having a currently active session with a given WAP or by using the IMSI-to-MAC mapping for the UE 12 and determining a location of UE 12 using RSSI measurements and/or TDOA measurements for one or more WAPs that the UE 12 may be in communication with through wireless beacons or by any combination thereof. WLE 34 may return the location of the UE 12 to the FLE 25. In some instances, the location may include a latitude/longitude location of the UE 12. In some instances the location may include an ID of a given WAP that the UE 12 may have a current session established with or that the UE 12 may be located in closest proximity.

FLE 25 may receive the location of the UE 12 and may query RF/GL server 24 with the location of the UE 12 and the target channel configuration for the UE 12. RF/GL server 24 and may return a list of one or more potential hand-in target FAPs near the location of the UE 12. The list of one or more potential hand-in target FAPs can include, for each of the one or more potential target hand-in FAPs, a FAP location and a FAP channel configuration matching the target channel configuration for the UE 12. By returning the channel configuration for the one or more potential hand-in target FAPs, FLE 25 can further narrow down the list of one or more potent target FAPs to those having a channel configuration matching the target channel configuration for the UE 12. For example, in a 3G implementation, this would allow an FLE to further narrow down potential target HNBs by matching UARFCN/PSC of potential target HNBs to those associated with a given pseudo cell ID. In other instances, the list may be ranked with a highest ranking potential target FAP being closest to the location of the location of the UE.

FLE 25 can compare locations for each potential target FAP to determine a potential target FAP nearest to the location of the UE and can compare the channel configurations for each potential target FAP to the target channel configuration of UE 12 to determine a matching configuration for a potential target FAP. FLE 25 can select the particular target FAP from the potential target FAPs based, at least in part, on the location of the particular target FAP being nearest to the location of UE 12 and having a channel configuration that matches the target channel configuration for the UE 12. Based on the selection of the particular target FAP, FGW 23 may task the particular target FAP to continue further hand-in operations. For example, in a 3G implementation, based on the selection, the HNB-GW may communicate a relocation request to a particular target HNB and further hand-in operations may continue using various Serving Radio Network Subsystem (SRNS) relocation operations. Thus, the solution as provided by communication system to provide for hand-in disambiguation using UE WiFi location may result in a reduction of dropped voice calls when a UE moves into small cell coverage; may reduce UE interference due to no handover where the UE may continue to increase transmit power to reach a faraway macro cell; and may provide interoperability with existing UEs and macro RNCs.

In an embodiment, FLE 25 may keep track of or maintain a handover history for the given UE in relation to handover success rates for past hand-in operations for particular target FAPs. The success rates may be used by FLE 25 to determine a handover success factor for each of a particular FAP 20, 21, 22 for past handovers for a given UE 12. In such embodiments, upon more than one candidate target FAP being near to the location of UE 12 and having a matching channel configuration, FLE 25 may select a target FAP in the vicinity of UE 12 based additionally on a candidate target FAP having a high handover success factor of past handovers for the UE 12 in comparison to handover success factors for other candidate target FAPs. In another embodiment, upon a handover failure of UE 12 to a particular target FAP, FLE 25 may compare handover success rates for other potential target FAPs (e.g., excluding the FAP for which the hand-in failed) in order to select another particular target FAP for hand-in of UE 12. The handover success rates and/or success factors may be stored in femtocell database 26.

Some FAPs may be configured in a Closed access mode (as opposed to Open or Hybrid access modes), meaning that users who are not included on an authorization list (e.g., whitelist, enterprise directory list, directory list, etc.) for a FAP cannot consume resources for the FAP (e.g., cannot attach to the FAP). In an embodiment, FLE 25 may filter out or remove from the list of potential target FAPs any potential target FAP that may be in a Closed access mode. FGW 23 can query FAPs 20, 21, 22 to determine access mode information for the FAPs and/or such information may be registered/stored in FGW 23. Filtering potential target FAPs based on being in a Closed access mode may be beneficial in certain instances where a potential target FAP may perform access control based on an authorization list (e.g., whitelist, enterprise directory list, etc.) but FGW 23 may not have access to the authorization list.

In another embodiment, FLE 25 may filter out or remove from the list of potential target FAPs any potential target FAP that may be in a Closed access mode and that the user may not be authorized to access. In such cases, FGW 23 may have access to authorization lists for potential target FAPs that are in a Closed access mode. In some embodiments, FGW 23 can be configured with a whitelist for each FAP 20, 21, 22 or FGW 23 can perform a look-up from using a RADIUS Access-Request to an AAA server in service provider network 50 to determine whitelists for FAPs 20, 21, 22. In such embodiments, FLE 25 may compare a user IMSI with IMSI whitelist entries for Closed access mode FAPs to determine if the user is authorized to access a potential target FAP. In other embodiments, FGW 23 can perform a look-up to an enterprise directory to determine authorized users for each FAP 20, 21, 22. In such embodiments, FLE 25 may compare a user IMSI with entries in the enterprise directory for Closed access mode FAPs to determine if the user is authorized to access a potential target FAP. Filtering based on a potential target FAP being in Closed access mode and/or user authorization to access a potential target FAP in Closed access mode may further narrow down the list of potential target FAPs for hand-in of a given user/UE. In certain embodiments, filtered out FAPs may be stored in a list that may be accessed on subsequent hand-in operations.

In various embodiments, UE 12 can be associated with users, employees, customers, etc. wishing to initiate a communication in communication system 10 via some network. The term 'user equipment' is interchangeable with the terminology 'endpoint' and 'wireless device', where such terms are inclusive of devices used to initiate a communication, such as a computer, a personal digital assistant (PDA), a tablet, a laptop or electronic notebook, a cellular telephone, an i-Phone, an i-Pad, a Google Droid, an IP phone, or any other device, component, element, or object capable of initiating voice, audio, video, media, or data exchanges within communication system 10 using both WiFi and cellular/mobile communications.

UE 12 may also be inclusive of a suitable interface to the human user, such as a microphone, a display, a keyboard, or other terminal equipment. UE 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another. UE 12 can be able to communicate wirelessly using a macro cell, femtocell and/or wireless service via one of the FAPs 20, 21, 22 and one of WAPs 30, 31, 32. As UE 12 is moved from one location to another, FAPs 20, 21, 22 can hand off to one another (or to macro cell towers), enabling the user to experience continuous communication capabilities.

Each FAP 20, 21, 22 can offer suitable connectivity to a mobile/cellular network using any appropriate protocol or technique such as, for example, GERAN, UTRAN, E-UTRAN or any other appropriate standard. Each WAP 30, 31, 32 can offer suitable connectivity to a wired network using WiFi, or, in some embodiments, Bluetooth, WiMAX or any other appropriate standard. Each WAP 30, 31, 32 may encompass wireless network appliances such as a WiFi array, a wireless bridge (e.g., between networks sharing a same Service Set Identifier (SSID) and radio channel), a wireless local area network (LAN). In certain cases, access points can connect to a router (via a wired network) that can relay data between UE and wired devices of either network.

In one example implementation, FGW 23, WC 33, WLE 34 and AAA server 35 are network elements that facilitate or otherwise helps coordinate hand-in disambiguation activities (e.g., for networks such as those illustrated in FIG. 1). In another example implementation, a femtocell location engine may be implemented in another a network element that facilitates or otherwise helps coordinate hand-in disambiguation activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, FAPs 20, 21, 22, FGW 23, RF/GL server 24, FLE 25, WAPs 30, 31, 32, WC 33, WLE 34 and/or AAA server 35 include software to achieve the hand-in disambiguation operations and/or features, as outlined herein in this disclosure. In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof.

Figure 2:
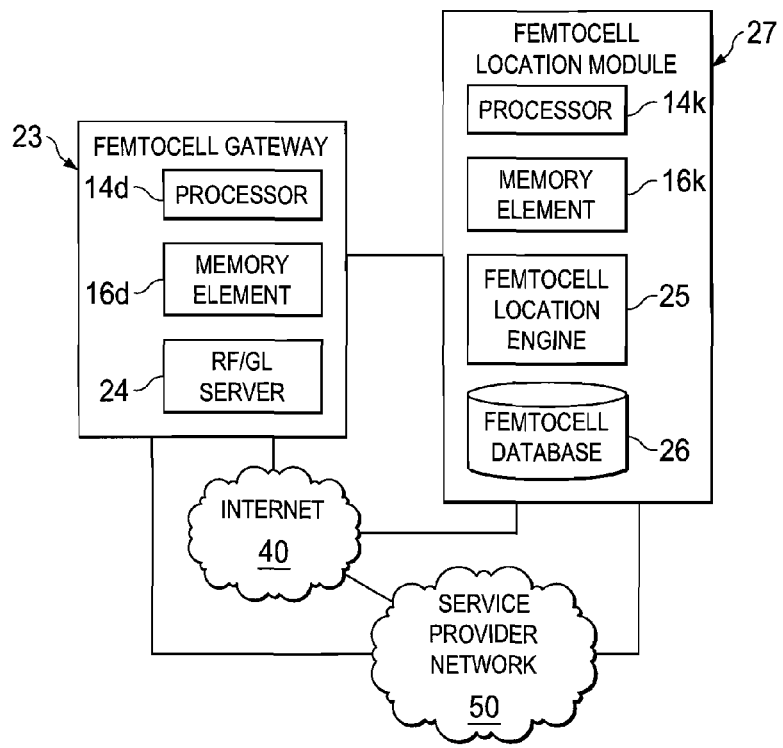
FIG. 2 is a simplified block diagram illustrating example details of the communication system in accordance with one embodiment of the communication system.

Turning to FIG. 2, FIG. 2 is a simplified block diagram illustrating example details of the communication system 10 in accordance with one embodiment. FIG. 2 includes FGW 23, a femtocell location module (FLM) 27, internet 40 and service provider network 50. Further illustrated in FIG. 2, FGW 23 includes processor 14$d$, memory element 16$d$ and RF/GL server 24. FLM 27 includes a processor 14$k$, a memory element 16$k$, FLE 25 and femtocell database 26. FGW 23 and FLM 27 may each be connected to internet 40 and service provider network 50 in this example implementation. Processor 14$k$ and memory element 16$k$ may facilitate the hand-in disambiguation activities as described herein.

In one example embodiment, FGW 23 may communicate a hand-in request including the user IMSI for UE 12 and a pseudo cell ID to FLE 25 implemented FLM 27 in order to select a target FAP for hand-in of UE 12. FLE 25 may query WLE 34 using a SOAP/HTTP query using the user IMSI to determine the UE 12 location based on its association with one or more WAPs 30, 31, 32 in the wireless system. WLE 34 may determine the location of UE 12 using techniques as described above for FIG. 1. FLE 25 may receive the UE location from the WLE 34. FLE 25 may also query RF/GL server 24 in FGW 23 using the location of the UE 12 and the target channel configuration for UE 12. RF/GL server 24 may return a list of one or more potential hand-in target FAPs near the location of the UE 12. The list of one or more potential hand-in target FAPs can include, for each of the one or more potential target hand-in FAPs, a FAP location and a FAP channel configuration matching the target channel configuration for the UE 12. FLE 25 can select from the potential target FAPs a particular target FAP for hand-in of the UE 12 based, at least in part, on a location of the particular target FAP being near to the location of the UE and having a channel configuration that matches the target channel configuration for the UE 12. FLM 27 can communicate the selected target FAP to FGW 23. FGW 23 may task the particular target FAP to continue further hand-in operations for UE 12.

In some instances, FLE 25 can maintain handover success factors for past hand-in operations, as discussed above, which can be used to further disambiguate multiple potential target FAPs that may be near the location of the UE 12 and that have channel configuration matching the target channel configuration for the UE 12 or in cases where a hand-in may fail. In one example for a 3G implementation, femtocell database 26 may be implemented as an HNB location database external to an HNB-GW for storing location and/or channel information of one or more HNBs for use in disambiguation activities.

In another example embodiment, another network element, such as, for example an MME within service provider network 50 for a 4G (LTE) network implementation may communicate a hand-in relocation request to the FLE 25 implemented in FLM 27 and FLE 25 may perform hand-in disambiguation activities as described throughout the present disclosure. Among other things, the MME in a 4G (LTE) network provides tracking area list management, idle mode UE tracking, bearer activation and deactivation, serving gateway and packet data network gateway selection for UEs and authentication services.

Figure 3:
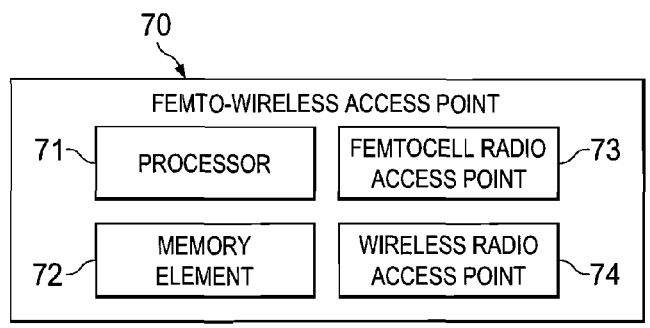
FIG. 3 is a simplified block diagram illustrating other example details of the communication system in accordance with one embodiment of the communication system.

Turning to FIG. 3, FIG. 3 is a simplified block diagram illustrating other example details of the communication system 10 in accordance with one embodiment. FIG. 3 illustrates a converged femto-wireless access point (AP) 70 including a processor 71, a memory element 72, a femtocell radio access point (FAP) 73 and a wireless radio access point (WAP) 74. Femto-wireless AP 70 may be connected to FGW 23, WC 33 and WLE 34 through internet 40. In some embodiments, a corresponding femto-wireless AP may be implemented in place of each corresponding FAP/WAP set as shown in FIG. 1. Processor 71 and memory element 72 may facilitate operations described herein.

For implementations of communication system 10 including femto-wireless AP 70, FAP 73 may register its location and channel configuration information with FGW 23 and WAP 74 may register its location as well as a WAP ID corresponding to WAP 74 with WC 33 and/or WLE 34. RF/GL server 24 and/or FLE 25 may store the WAP ID and associated FAP information for use in determining a target FAP for hand-in. In operation, when WLE 34 may be queried for the UE location based on its association to one or more WAPs in the wireless system, WLE 34 may include its corresponding WAP ID for the UE location. In some instances, WLE 34 can include both its corresponding WAP ID and the UE location in a latitude/longitude location. In other instances, WLE 34 can include either its corresponding WAP ID or a location of UE in latitude/longitude. Based on a given WAP ID received from WLE 34, FLE 25 may select a target FAP for hand-in based on the previously stored FAP/WAP association.

Figure 4:
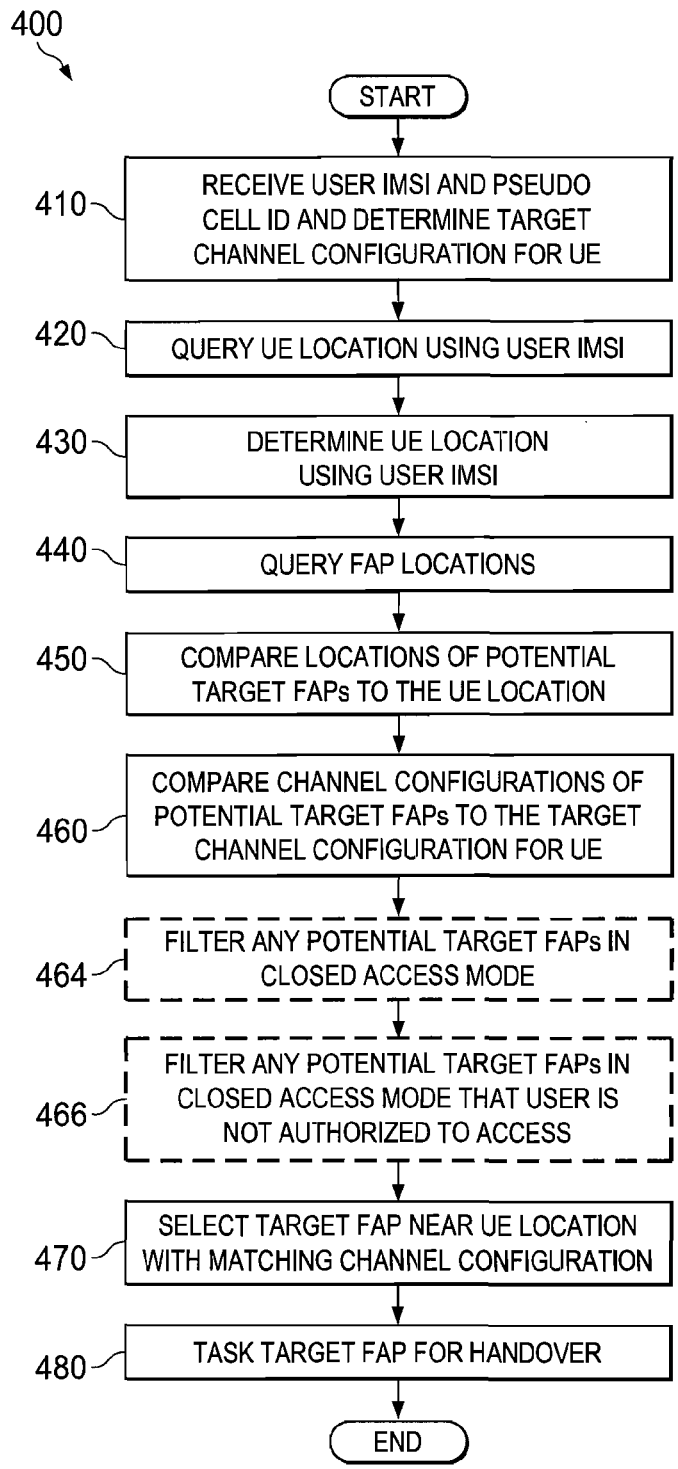
FIG. 4 is a simplified flow diagram illustrating example operations associated with hand-in disambiguation in accordance with one embodiment of the communication system.

Turning to FIG. 4, FIG. 4 is a simplified flow diagram 400 illustrating example operations associated with hand-in disambiguation in one example operation of communication system 10. In one particular embodiment, these operations may involve RF/GL server 24, FLE 25, FGW 23 and WLE 34. For the example operations, it is assumed that at least location information and channel configuration information for each FAP 20, 21, 22 has been registered in RF/GL server 24 and that at least location information for each WAP 30, 31, 32 has been registered in wireless database 36. In some cases, if femto-wireless APs are implemented in the communication system 10, a WAP ID for each WAP 30, 31, 32 may be stored in the wireless database 36. It is further assumed that WC and/or WLE 34 includes either an operator configured IMSI-to-MAC mapping for the user/UE combination for a given UE 12 and/or an IMSI-to-MAC mapping for the user/UE combination based on an EAP-SIM/AKA authorization for a previous or active session for the given UE 12.

Based on measurement reports received from UE 12 a macro cell controller (e.g., RNC or eNodeB) may determine to initiate a hand-in for UE 12 by transmitting a pseudo cell ID and corresponding IMSI of a user associated with the UE 12 to FLE 25 so that the FLE can disambiguate the pseudo cell ID to a specific target FAP closest to the location of the UE 12 for the hand-in. Thus, processing may start when the user IMSI and pseudo cell ID may be received by FLE 25 at 410. Based on the received pseudo cell ID, FLE 25 may determine a target channel configuration for the UE 12 at 410. The target channel configuration may correspond to a channel configuration for one or more of FAPs 20, 21, 22.

At 420, FLE 25 may query WLE 34 using the user IMSI to determine the location of UE 12 based on its association with one or more WAPs 30, 31, 32 in the wireless system. At 430, WLE 34 may determine the location of the UE 12 based on the location of the UE 12 in relation to one or more WAPs 30, 31, 32. As noted, using the user IMSI for the UE and recovered IMSIs from previous authentications, WLE 34 can determine the UE location by UE 12 having a currently active session with a given WAP or by using the IMSI-to-MAC mapping for UE 12 and determining a location of UE 12 using RSSI measurements and/or TDOA measurements for one or more WAPs that the UE 12 may be in communication with through wireless beacons or by any combination thereof. FLE 25 may receive the location of the UE from WLE 34. In some instances, the location may include a latitude/longitude of the UE 12. In some instances the location may include an ID of a given WAP that the UE 12 may have an active session with or that may be nearest to UE 12.

At 440, FLE 25 may query RF/GL server 24 with the location of the UE 12 and the target channel configuration for the UE 12. The RF/GL server 24 and may return a list of one or more potential target FAPs near the location of the UE 12. The list of one or more potential target FAPs can include, for each of the one or more potential target hand-in FAPs, a FAP location and a FAP channel configuration matching the target channel configuration for the UE 12.

At 450, FLE 25 can compare locations for each potential target FAP to determine a potential target FAP nearest to the location of the UE. At 460, FLE 25 can compare the channel configurations for each potential target FAP to the target channel configuration of UE 12 to determine a matching configuration for a potential target FAP. At 470, FLE 25 can select from the potential target FAPs a particular target FAP for hand-in of the UE 12 based on a location of the particular target FAP being nearest to the location of the UE and having a channel configuration that matches the target channel configuration for the UE 12. Based on the selection of the particular target FAP, FGW 23 may task the particular target FAP at 480 to continue further hand-in operations.

In an embodiment, as shown at 464, FLE 25 may filter out or remove any of the one or more potential target FAPs from the list of potential target FAPs that is in a Closed access mode. In another embodiment, as shown at 466, FLE 25 may filter out or remove any of the one or more potential target FAPs from the list of potential target FAPs that is in a Closed access mode and that the user is not be authorized to access. In such embodiments, the filtering may not occur for potential target FAPs that may be in an Open or Hybrid access mode.

Figure 5:
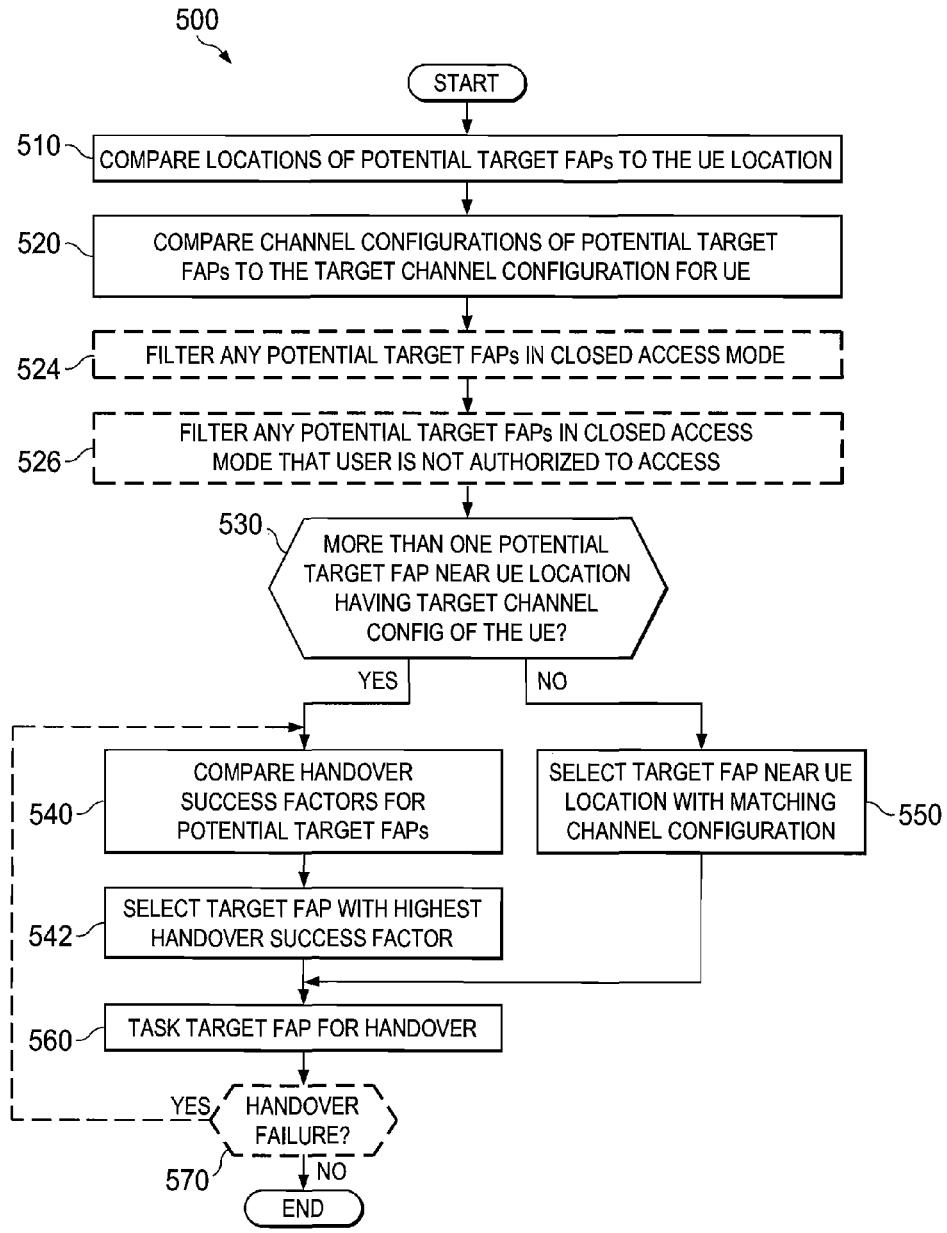
FIG. 5 is a simplified flow diagram illustrating example operations associated with selecting a target femtocell access point for hand-in in accordance with one embodiment of the communication system.

Turning to FIG. 5, FIG. 5 is a simplified flow diagram 500 illustrating other example operations associated with selecting a particular target FAP for hand-in of the UE in one example operation of communication system 10. In one particular embodiment, the following operations may involve FLE 25 and FGW 23. Alternatively, these operations may include one of FAPs 20, 21, 22 (e.g., for a hand-in failure to a particular target FAP). Recall, in some embodiments that FLE 25 may maintain a handover history for a given UE 12 in relation to handover success rates for past hand-in operations for particular target FAPs. The success rates may be used by FLE 25 to determine a handover success factor for each of a particular FAP for past handovers for a given UE 12. It is assumed for the operations described below that FLE 25 has and/or has access to the location of the UE, the target channel configuration for the UE, locations of potential target FAPs and channel configurations for potential target FAPs, all of which can be determined using steps 410-440 described for FIG. 4.

At 510, FLE 25 can compare locations for each potential target FAP to determine a potential target FAP nearest to the location of the UE. At 520, FLE 25 can compare the channel configurations for each potential target FAP to the target channel configuration of UE 12 to determine a matching configuration for a potential target FAP. FLE 25 may determine at 530 if more than one potential target FAP is near the location of the UE and has a channel configuration matching the target channel configuration for the UE. If so, FLE 25 may compare handover success factors for each of the potential target FAPs at 540 to determine a particular target FAP having the highest handover success factor in comparison to the other potential target FAPs. FLE 25 may select the particular target FAP having the highest success factor for hand-in of the UE at 542. Based on the selection of the particular target FAP, FGW 23 may task the particular target FAP at 560 to continue further hand-in operations.

Otherwise, if there is not more than one potential target FAP near the location of the UE and that has a channel configuration matching the target channel configuration for the UE, at 550, FLE 25 can select from the potential target FAPs a particular target FAP for hand-in of the UE 12 based on a location of the particular target FAP being nearest to the location of the UE and having a channel configuration that matches the target channel configuration for the UE 12. FGW 23 may task the particular target FAP at 560 to continue further hand-in operations.

In one embodiment, the handover operations may be monitored by FGW 23 to ensure that the hand-in is successful at 570. If the hand-in is not successful, FLE 25 may again compare handover success factors for each of the potential target FAPs in the vicinity of UE 12 at 540 to determine another particular target FAP having the highest handover success factor in comparison to the other potential target FAPs. The comparison may exclude the FAP for which the hand-in failed. FLE 25 may select a particular target FAP having the highest handover success factor in the vicinity of UE 12 for hand-in at 542. Based on the selection of the particular target FAP, FGW 23 may task the particular target FAP at 560 to continue further hand-in operations.

In an embodiment, as shown at 524, FLE 25 may filter out or remove any of the one or more potential target FAPs from the list of potential target FAPs that is in a Closed access mode. In another embodiment, as shown at 526, FLE 25 may filter out or remove any of the one or more potential target FAPs from the list of potential target FAPs that is in a Closed access mode and that the user is not be authorized to access. In such embodiments, the filtering may not occur for potential target FAPs that may be in an Open or Hybrid access mode.

Figure 6:
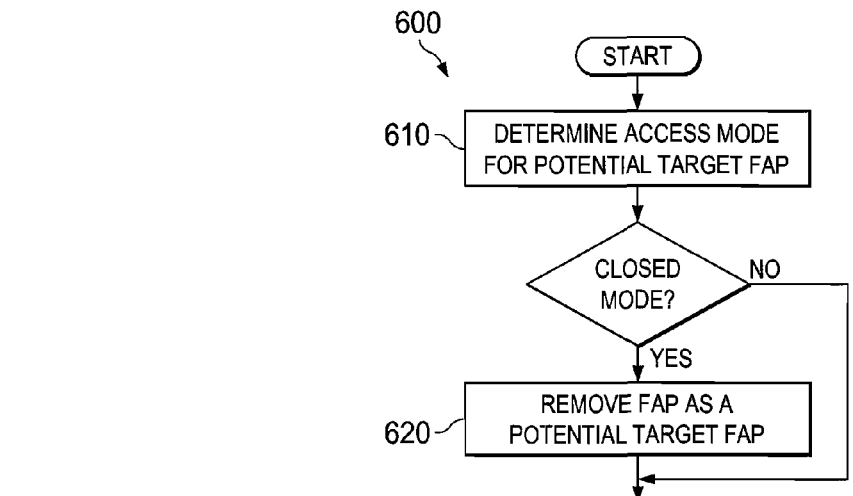
FIG. 6 is a simplified flow diagram illustrating example operations associated with filtering potential target femtocell access points based on access mode.

Turning to FIG. 6, FIG. 6 is a simplified flow diagram illustrating example operations 600 associated with filtering potential target FAPs based on FAP access mode in one example operation of communication system 10. The operations as shown in FIG. 6 may be performed for each of one or more potential target FAPs. At 610, FLE 25 may determine an access mode for a potential target FAP. If the potential target FAP is in a Closed access mode, FLE 25 may remove the potential target FAP from a list of potential target FAPs at 620. If the potential target FAP is not in a Closed mode, the operations may continue (e.g., continue to selecting a particular target FAP as shown at 470 of FIG. 4).

Figure 7:
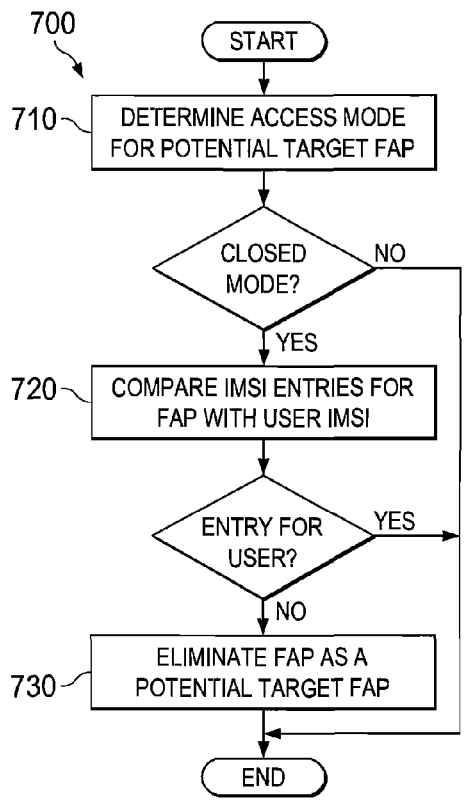
FIG. 7 is a simplified flow diagram illustrating example operations associated with filtering potential target femtocell access points based on access mode and user access in accordance with one embodiment of the communication system.

Turning to FIG. 7, FIG. 7 is a simplified flow diagram illustrating example operations 700 associated with filtering potential target FAPs based on FAP access mode and user authorization to access potential target FAPs in one example operation of communication system 10. It is assumed for the operations 700 shown in FIG. 7 that FGW 23 has been configured with or otherwise determined IMSI authorization lists (e.g., whitelists, directory lists, etc.) for FAPs 20, 21 and 22. The operations 700 as shown in FIG. 7 may be performed for each of one or more potential target FAPs. At 710, FLE 25 may determine an access mode for a potential target FAP. If the potential target FAP is in a Closed access mode, FLE 25 may compare IMSI entries of an authorization list for the potential target FAP with the user's IMSI at 720. If the potential target FAP is not in a Closed mode, the operations may continue (e.g., continue to selecting a particular target FAP as shown at 470 of FIG. 4).

The authorization list can be an IMSI whitelist, an enterprise directory list including one or more user IMSIs or a general directory list including one or more user IMSIs. Based on the comparing at 720, if there is not an IMSI entry matching the user's IMSI, FLE 25 may remove the potential target FAP from a list of potential target FAPs at 730. Otherwise, if there is an IMSI entry matching the user's IMSI, the operations may continue (e.g., continue to selecting a particular target FAP as shown at 470 of FIG. 4).

In regards to the internal structure associated with communication system 10, each of FAPs 20, 21, 22, FGW 23, WAPs 30, 31, 32, WC 33, WLE 34, AAA server 35, FLM 27 and femto-wireless AP 70 can include memory elements for storing information to be used in achieving the hand-in disambiguation operations, as outlined herein. Additionally, each of these devices may include a processor that can execute software or an algorithm to perform the hand-in disambiguation activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to FAPs 20, 21, 22, FGW 23, WAPs 30, 31, 32, WC 33, WLE 34, AAA server 35, FLM 27 and femto-wireless AP 70 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the hand-in disambiguation functions outlined herein may be implemented by logic encoded in one or more tangible media, which may be inclusive of non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIGS. 1-3] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIGS. 1-3] could transform an element or an article (e.g., data) from one state or thing to another state or thing. In another example, the hand-in disambiguation activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the previously described activities illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 10 may be applicable to other exchanges, routing protocols, or routed protocols in which in order to provide hand-in access to a network. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a handover request from a first radio network to handover a user equipment (UE) to a second radio network, wherein the handover request includes an international mobile subscriber identity (IMSI) for a user associated with the UE and a pseudo cell identifier (ID) and wherein the second radio network includes a plurality of target access points;
   determining a target channel configuration for the UE based on the pseudo cell ID;
   querying a third radio network using the user IMSI to determine a location of the UE, wherein at least one access point in the third radio network is in communication with the UE; and
   selecting a particular target access point in the second radio network for handover of the UE based, at least in part, on the location of the UE, the target channel configuration for the UE and a location of the particular target access point.

2. The method of claim 1, wherein the plurality of target access points in the second radio network are at least one of: a Home Node B (HNB); a Node B (NB); a Home eNode B (HeNB); and an eNode B (eNodeB).

3. The method of claim 1, further comprising:
   registering a location for each of the plurality of target access points in the second radio network; and
   registering a location for each of a plurality of access points in the third radio network.

4. The method of claim 1, wherein the selecting the particular target access point further comprises:
   comparing a location for each of the plurality of target access points to the location of the UE to determine one or more potential target access points near the location of the UE;
   comparing a channel configuration for each of the one or more potential target access points to the target channel configuration for the UE to determine one or more potential target access points having a channel configuration that matches the target channel configuration for the UE; and
   selecting the particular target access point from the one or more potential target access points that has a location near the location of the UE and that has a channel configuration that matches the target channel configuration for the UE.

5. The method of claim 4, further comprising:
   filtering out from the one or more potential target access points any potential target access point that is in a closed access mode.

6. The method of claim 4, further comprising:
   filtering out from the one or more potential target access points any potential target access point that is in a closed access mode that the user is not authorized to access.

7. The method of claim 4, further comprising:
   maintaining a handover history for each of the one or more potential target access points, wherein the handover history comprises the user IMSI and a handover success factor for each of the one or more potential target access points that indicates handover success rates for past handovers to the one or more potential target access points for the UE;
   if more than one potential target access point is near the location of the UE and has a channel configuration that matches the target channel configuration for the UE, comparing the handover success factors for each of the one or more potential target access points to determine a highest handover success factor for a corresponding potential target access point; and
   selecting the particular target access point from the one or more potential target access points that has a location near the location of the UE, that has a channel configuration that matches the target channel configuration for the UE and that has the highest handover success factor.

8. The method of claim 1, wherein the target channel configuration for the UE comprises a frequency channel number and at least one of: a scrambling code; and a physical cell identifier.

9. The method of claim 1, further comprising:
   prior to receiving the handover request, registering the user IMSI in the third radio network.

10. The method of claim 9, wherein the registering the user IMSI with the third radio network comprises at least one of:
    authenticating the UE with the third radio network using an extensible authentication protocol subscriber identity module (EAP-SIM) authentication technique to determine the user IMSI;
    authenticating the UE with the third radio network using a EAP authentication and key agreement (EAP-AKA) authentication technique to determine the user IMSI; and
    storing, in the third radio network, a media access control (MAC) address of the UE associated with the user IMSI.

11. The method of claim 1, wherein the location of the UE includes a latitude and longitude of the UE.

12. The method of claim 1, wherein the location of the UE includes an access point identity for an access point in the third radio network that is in communication with the UE.

13. The method of claim 1, wherein the third radio network comprises one or more wireless radio access points.

14. One or more non-transitory tangible media encoding logic that include instructions for execution that, when executed by a processor, is operable to perform operations comprising:

receiving a handover request from a first radio network to handover a user equipment (UE) to a second radio network, wherein the handover request includes an international mobile subscriber identity (IMSI) for a user associated with the UE and a pseudo cell identifier (ID) and wherein the second radio network includes a plurality of target access points;

determining a target channel configuration for the UE based on the pseudo cell ID;

querying a third radio network using the user IMSI to determine a location of the UE, wherein at least one access point in the third radio network is in communication with the UE; and selecting a particular target access point in the second radio network for handover of the UE based, at least in part, on the location of the UE, the target channel configuration for the UE and a location of the particular target access point.

15. The media of claim 14, wherein the operations further comprise:

registering a location for each of the plurality of target access points in the second radio network; and registering a location for each of a plurality of access points in the third radio network.

16. The media of claim 14, wherein the operations for selecting the particular target access point further comprise:

comparing a location for each of the plurality of target access points to the location of the UE to determine one or more potential target access points near the location of the UE;

comparing a channel configuration for each of the one or more potential target access points to the target channel configuration for the UE to determine one or more potential target access points having a channel configuration that matches the target channel configuration for the UE; and selecting the particular target access point from the one or more potential target points that has a location near the location of the UE and that has a channel configuration that matches the target channel configuration for the UE.

17. The media of claim 16, wherein the operations further comprise:

maintaining a handover history for each of the one or more potential target access points, wherein the handover history comprises the user IMSI and a handover success factor for each of the one or more potential target access points that indicates handover success rates for past handovers to the one or more potential target access points for the UE;

if more than one potential target access point is near the location of the UE and has a channel configuration that matches the target channel configuration for the UE, comparing the handover success factors for each of the one or more potential target access points to determine a highest handover success factor for a corresponding potential target access point; and selecting the particular target access point from the one or more potential target access points that has a location near the location of the UE, that has a channel configuration that matches the target channel configuration for the UE and that has the highest handover success factor.

18. The media of claim 14, wherein the operations further comprise:

registering the user IMSI in the third radio network, wherein the registering includes at least one of:

authenticating the UE with the third radio network using an extensible authentication protocol subscriber identity module (EAP-SIM) authentication technique to determine the user IMSI;

authenticating the UE with the third radio network using a EAP authentication and key agreement (EAP-AKA) authentication technique to determine the user IMSI; and storing, in the third radio network, a media access control (MAC) address of the UE associated with the user IMSI.

19. An apparatus, comprising:
a femtocell location engine;
a memory element for storing data; and
a processor that executes instructions associated with the data, wherein the processor and memory element cooperate such that the apparatus is configured for:

receiving, at the apparatus, a handover request from a first radio network to handover a user equipment (UE) to a second radio network, wherein the handover request includes an international mobile subscriber identity (IMSI) for a user associated with the UE and a pseudo cell identifier (ID) and wherein the second radio network includes a plurality of target access points;

determining a target channel configuration for the UE based on the pseudo cell ID;

querying a third radio network using the user IMSI to determine a location of the UE, wherein at least one access point in the third radio network is in communication with the UE; and selecting a particular target access point in the second radio network for handover of the UE based, at least in part, on the location of the UE, the target channel configuration for the UE and a location of the particular target access point.

20. The apparatus of claim 19, wherein the target channel configuration for the UE comprises a frequency channel number and at least one of: a scrambling code; and a physical cell identifier.

* * * * *